United States Patent
Hac et al.

(10) Patent No.: US 7,016,783 B2
(45) Date of Patent: Mar. 21, 2006

(54) COLLISION AVOIDANCE WITH ACTIVE STEERING AND BRAKING

(75) Inventors: Aleksander B. Hac, Dayton, OH (US); John E. Dickinson, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 300 days.

(21) Appl. No.: 10/402,400

(22) Filed: Mar. 28, 2003

(65) Prior Publication Data

US 2004/0193374 A1 Sep. 30, 2004

(51) Int. Cl.
*G06F 17/10* (2006.01)

(52) U.S. Cl. ............... 701/301; 701/71; 180/167; 180/169; 340/902; 303/113.1; 303/146

(58) Field of Classification Search ........... 701/70–73, 701/93, 301; 180/167, 169; 340/902, 903; 303/113.1, 146, 150
See application file for complete search history.

(56) References Cited

U.S. PATENT DOCUMENTS

| | | | |
|---|---|---|---|
| 5,366,291 A | 11/1994 | Nakagama et al. ......... 374/153 |
| 5,471,214 A | 11/1995 | Faibish et al. ................. 342/70 |
| 5,473,538 A | 12/1995 | Fujita et al. ........... 364/424.05 |
| 5,684,697 A | 11/1997 | Mullen ................ 364/424.033 |
| 5,699,040 A | 12/1997 | Matsuda ..................... 340/435 |
| 5,714,947 A | 2/1998 | Richardson et al. ........ 340/903 |
| 5,818,355 A | 10/1998 | Shirai et al. ................ 340/903 |
| 6,002,983 A | 12/1999 | Alland et al. |
| 6,035,053 A * | 3/2000 | Yoshioka et al. ........... 382/104 |
| 6,044,321 A * | 3/2000 | Nakamura et al. ............ 701/96 |
| 6,125,319 A | 9/2000 | Hac et al. ..................... 701/80 |
| 6,226,389 B1 | 5/2001 | Lemelson et al. .......... 382/104 |
| 6,275,773 B1 * | 8/2001 | Lemelson et al. .......... 701/301 |
| 6,323,763 B1 | 11/2001 | Bohner et al. .............. 340/436 |
| 6,338,022 B1 | 1/2002 | Shinmura et al. ........... 701/301 |
| 6,353,788 B1 | 3/2002 | Baker et al. .................. 701/96 |
| 6,433,679 B1 | 8/2002 | Schmid ....................... 340/435 |
| 6,445,308 B1 * | 9/2002 | Koike ......................... 340/902 |
| 6,456,920 B1 | 9/2002 | Nishio et al. ................. 701/70 |
| 2001/0012976 A1 | 8/2001 | Menig et al. ..................... 701/1 |
| 2003/0213640 A1 * | 11/2003 | Kato et al. ................... 180/446 |
| 2005/0060071 A1 * | 3/2005 | Winner ......................... 701/36 |

FOREIGN PATENT DOCUMENTS

EP    0 738 648 B1    4/1996
EP    1 075 992 A2    7/2000

* cited by examiner

*Primary Examiner*—Jack Keith
*Assistant Examiner*—Ronnie Mancho
(74) *Attorney, Agent, or Firm*—Michael D. Smith

(57) ABSTRACT

A method for collision avoidance using automated braking and steering comprising: determining an actual distance to an obstacle in a path of a vehicle; determining a relative velocity between the obstacle and the vehicle; determining a first distance sufficient to avoid collision by braking only; determining a second distance sufficient to avoid collision by combined braking and steering around the obstacle. The method also includes: applying braking if at least one of, the first distance exceeds the actual distance and the first distance is within a selected threshold of the actual distance. If the actual distance exceeds the second distance and a lane change is permitted, steering control to affect a lane change is applied.

38 Claims, 6 Drawing Sheets

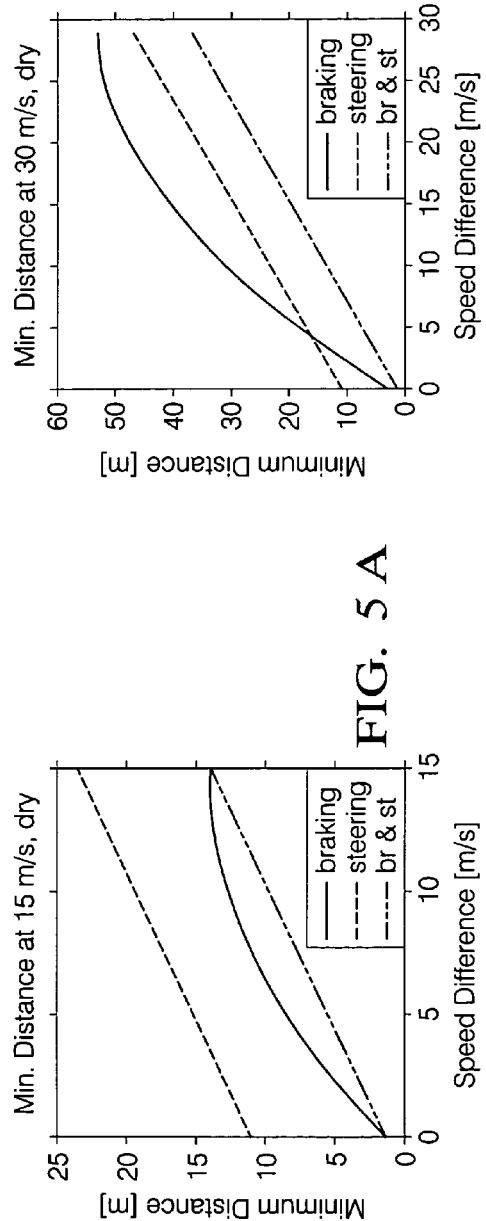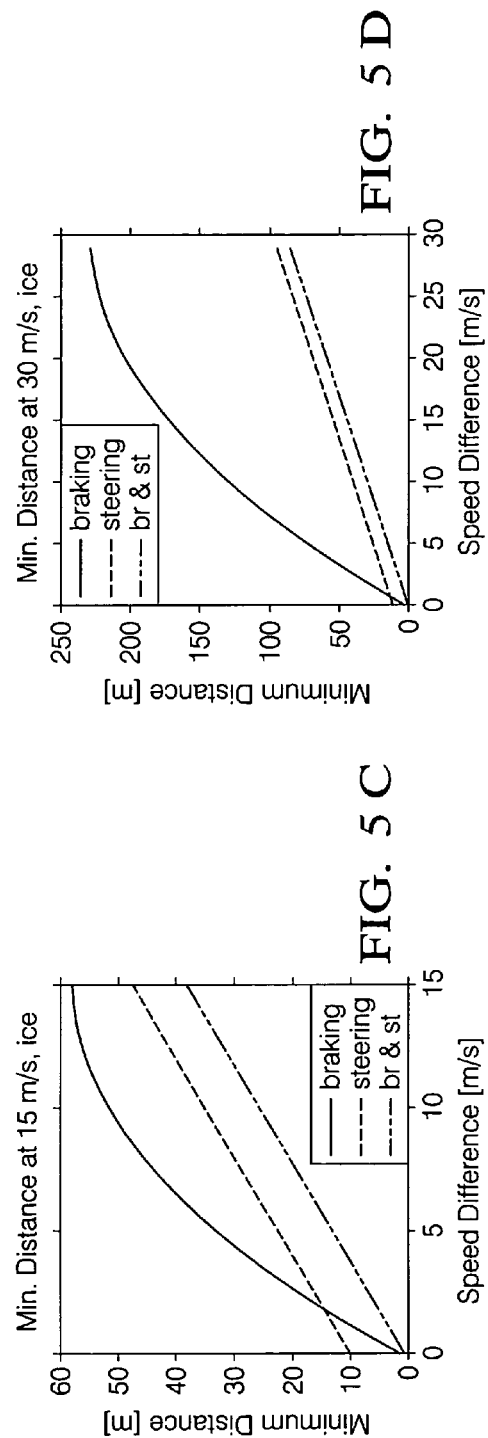

COLLISION AVOIDANCE WITH ACTIVE STEERING AND BRAKING

BACKGROUND

At present several technologies exist, which allow the monitoring of the conditions around moving vehicle and to detect presence of other vehicles and obstacles. Examples of such existing and emerging technologies are adaptive cruise control (ACC) systems and integrated safety systems. If an obstacle, such as a slower moving vehicle, is detected in front of vehicle, and it is determined on the basis of sensor information that this obstacle is too close, then the adaptive cruise control system can automatically reduce the speed of the host vehicle to match the speed of a leading slower vehicle. Speed reduction of the host vehicle is often achieved by a combination of throttle adjustment and mild braking. When the system determines that a collision cannot be avoided by limited braking, a warning is sent to the driver to initiate harder manual braking or steer to a clear lane.

Analysis of accident statistics indicates that in emergency situations, drivers usually either steer or brake, but seldom brake and steer simultaneously. This is probably due to the fact that, especially in panic situations, it is easier for most drivers to control one input at a time than two inputs simultaneously. In addition, driver maneuvers in panic situations are often too abrupt, leading to loss of vehicle control. This is particularly true when inclement weather has introduced slippery roadways reducing tire traction. Therefore, it would be desirable to have a system, which would not only brake automatically, but also smoothly change lanes in an obstacle avoidance maneuver.

BRIEF SUMMARY

Disclosed herein in an exemplary embodiment is a method for collision avoidance using automated braking and steering comprising: determining an actual distance to an obstacle in a path of a vehicle; determining a relative velocity between the obstacle and the vehicle; determining a first distance sufficient to avoid collision by braking only; determining a second distance sufficient to avoid collision by combined braking and steering around the obstacle. The method also includes: applying braking if at least one of, the first distance exceeds the actual distance and the first distance is within a selected threshold of the actual distance. If the actual distance exceeds the second distance and a lane change is permitted, steering control to affect a lane change is applied.

Also disclosed herein in an exemplary embodiment is a system for collision avoidance in a vehicle using automated braking and steering comprising: an active braking system comprising: a wheel actuator in operable communication with a vehicle wheel, a wheel speed sensor, and a sensor for detecting the application of braking by an operator, the active braking system including antilock braking functionality. The system also includes an active steering system comprising: an operator input device, an actuator in operable communication with a steerable wheel, the actuator configured to adjust a steering angle of the steerable wheel independent of an input to the operator input device; a first steering angle sensor in operable communication with the operator input device for detecting a steering angle indicative of an operator input, and a second steering angle sensor in operable communication with the steerable wheel for detecting another angle indicative of a position of the steerable wheel. The system further includes: a detection system comprising a sensor configured to detect an obstacle in a path of the vehicle and a controller 110 in operable communication with the active braking system, the active steering system, and the detection system. The controller 110 executes a method for collision avoidance using automated braking and steering.

Further disclosed herein in another exemplary embodiment is a system for collision avoidance in a vehicle using automated braking and steering comprising: a means for determining an actual distance to an obstacle in a path of a vehicle; a means for determining a relative velocity between the obstacle and the vehicle; a means for determining a first distance sufficient to avoid collision by braking only; and a means for determining a second distance sufficient to avoid collision by combined braking and steering around the obstacle. The system also includes a means for applying braking if at least one of, the first distance exceeds the actual distance and the first distance is within a selected threshold of the actual distance; a means for determining if the actual distance exceeds the second distance and a lane change is permitted, and a means for applying steering control to affect a lane change.

Further disclosed herein in yet another exemplary embodiment is a storage medium encoded with a machine-readable computer program code, the computer program code including instructions for causing controller (110) to implement the above mentioned method for collision avoidance using automated braking and steering.

Also disclosed herein in yet another exemplary embodiment is a computer data signal, the data signal comprising code configured to cause a controller 110 to implement the abovementioned method for collision avoidance using automated braking and steering.

Disclosed herein in another alternative embodiment is a method for collision avoidance using automated braking and steering comprising: determining an obstacle is in a path of a vehicle with which a collision may occur; applying maximum emergency braking without skidding; if a lane change is permitted, applying steering control to affect a lane change, wherein the steering control is configured to achieve a maximum lateral acceleration sufficient to cause lateral displacement without loss of surface adhesion.

Disclosed here in yet another alternative embodiment is a system for collision avoidance in a vehicle using automated braking and steering comprising: a means for determining an obstacle is in a path of a vehicle with which a collision may occur; a means for applying maximum emergency braking without skidding; a means for determining: if a lane change is permitted; and a means for applying steering control to affect a lane change, wherein the steering control is configured to achieve a maximum lateral acceleration sufficient to cause lateral displacement without loss of surface adhesion.

Also disclosed herein in another alternative embodiment is a method of controlling the steering angle input in order to automatically perform an emergency lane change comprising: using a feedforward control component and a feedback control components; the feedforward control component employing a selected steering pattern based on vehicle speed and an estimated surface coefficient of adhesion; and the feedback control component using a measured yaw rate, at least one of an estimated lateral position and a measured lateral position, and at least one of an estimated lateral velocity and a measured lateral velocity.

BRIEF DESCRIPTION OF THE DRAWINGS

The present invention will now be described, by way of an example, with references to the accompanying drawings, wherein like elements are numbered alike in the several figures in which:

FIG. 5A depicts an illustrative comparison of minimum distances versus speed difference for braking alone, steering alone, and combined braking and steering for a dry surface and a host vehicle speed of 15 meters/second;

FIG. 5B depicts an illustrative comparison of minimum distances versus speed difference for braking alone, steering alone, and combined braking and steering for a dry surface and a host vehicle speed of 30 meters/second;

FIG. 5C depicts an illustrative comparison of minimum distances versus speed difference for braking alone, steering alone, and combined braking and steering for an icy (slippery) surface and a host vehicle speed of 15 meters/second;

FIG. 5D depicts an illustrative comparison of minimum distances versus speed difference for braking alone, steering alone, and combined braking and steering for an icy (slippery) surface and a host vehicle speed of 30 meters/second;

DETAILED DESCRIPTION OF AN EXEMPLARY EMBODIMENT

Figure 1:
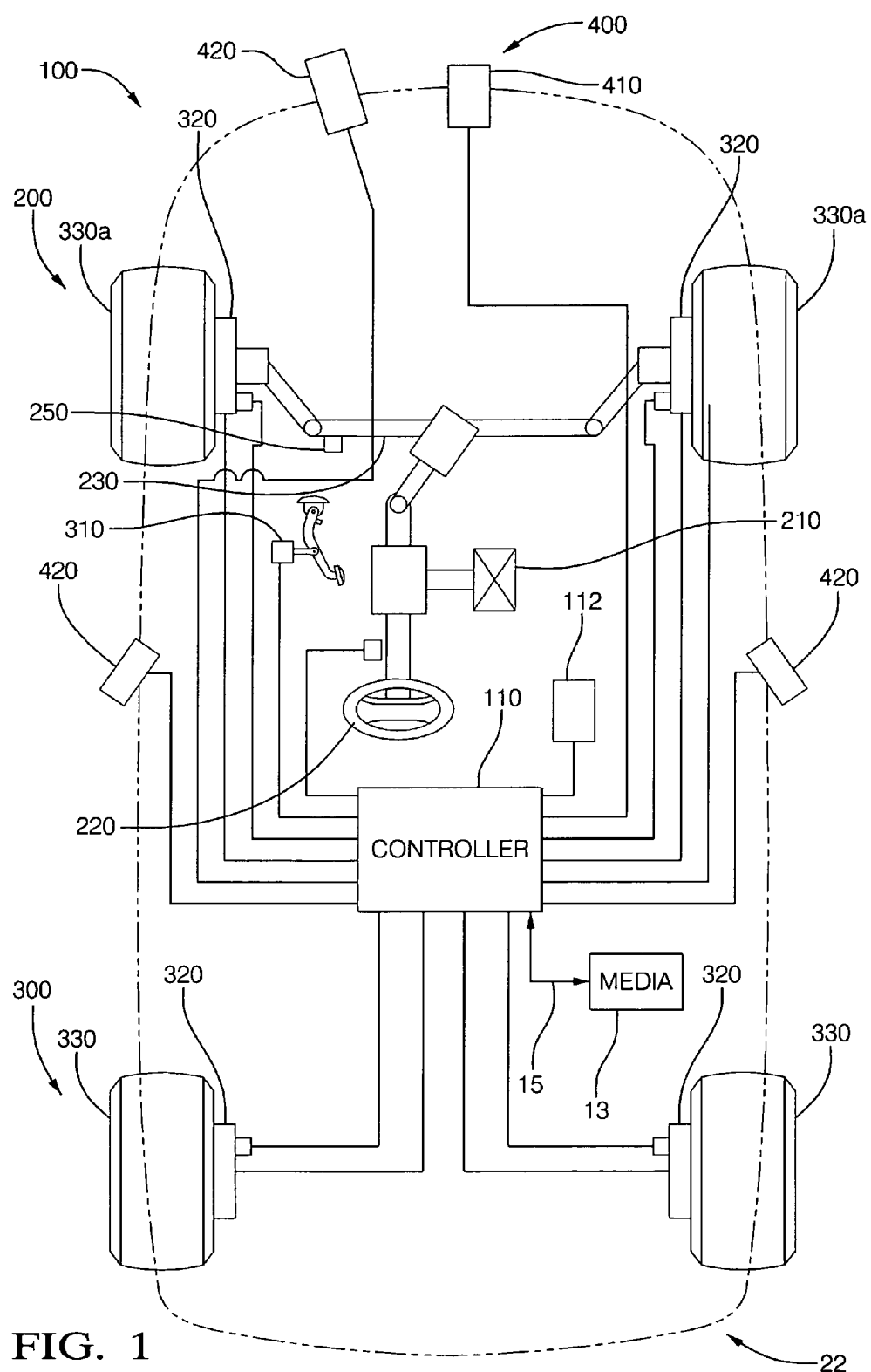
FIG. 1 depicts a control by-by-wire architecture for an exemplary collision avoidance system.

Disclosed herein is an algorithm to automatically perform a collision avoidance maneuver. In an exemplary embodiment an active steering system is optionally employed with braking in order to automatically perform an emergency lane change maneuver when it is determined that a collision cannot be prevented by braking only, but can be prevented by steering (around the obstacle) and braking. The determination is based on the information about the host vehicle speed, the speed of obstacle, the distance between the host vehicle and the obstacle, the lateral offset in the lane change necessary to avoid colliding with the obstacle, brake and steering response times, and lateral and longitudinal accelerations achievable during an emergency collision avoidance maneuver. Based on this information in an exemplary embodiment, minimum distances necessary to avoid collision by braking only and by braking and steering between the obstacle (also denoted as a lead vehicle) and the host vehicle (following) are determined. In an exemplary embodiment, an emergency lane change maneuver may be conducted when driver does not make a steering correction and the actual (measured) distance between the host vehicle and the obstacle is less than the minimum distance for braking alone, but more than the minimum distance for braking and steering. In addition, a determination is made to ensure that a lane change is permitted, either by ensuring that the adjacent lane is clear, or an operator cue to change lanes has been detected. It will be appreciated that there are several known means for determining that a lane is clear. In the case when it cannot be automatically determined, that the adjacent lane is clear, driver steering control action is used to provide permission for the lane change. Also disclosed herein is method to determine a steering pattern, which would satisfactorily perform an emergency lane change. A combination of feedforward and feedback control for the steering angle is used to execute the lane change in all surface conditions.

It will be appreciated that technologies, to facilitate active collision avoidance have attained at least prototype phase of development. First, radar, ultrasound and digital camera technologies used in ACC and back up assist systems are being applied to detect presence of vehicles or obstacles not only ahead and behind, but all around vehicle. Such systems can be used to determine that the adjacent lane is clear of traffic and the lane change maneuver can be safely performed if necessary. The second group of technologies are the active steering systems, which can change vehicle path automatically. These include: existing steer-by-wire systems, in which the front steering angle is controlled based on driver steering command and command from vehicle controller 110, active rear-wheel-steer in which the rear wheels can be steered in response to control commands (from the driver and the vehicle controller 110), active or augmented front steering systems in which the front steer angle can be modified by a selected amount relative to the driver-commanded steering angle. Advantageously each of these systems provide means for implementing an automatic steering input such as lane change independent or in addition to an operator steering input.

Referring now to FIG. 1, in an exemplary embodiment a control algorithm for a collision avoidance system 100, which uses active steering and braking systems 200 and 300 along with a detection system 400 such as radar and sonar technologies developed for active cruise control and back up assist systems. FIG. 1 depicts a vehicle equipped with an exemplary collision avoidance system in accordance with an exemplary embodiment. The collision avoidance system 100 employs a control algorithm that provides control signals for active steering and braking systems 200, 300 respectively when it is detected that an object, such as a slower moving vehicle, is on the vehicle path and too close, threatening a collision. The control algorithm performs two primary tasks: 1) determination when braking is sufficient to avoid collision and when a combination of braking and steering must be employed, and 2) determination of steering and braking inputs necessary to perform a collision-avoidance maneuver in a safe manner.

In an exemplary embodiment a vehicle hereinafter denoted as the host vehicle 22 is equipped with a collision avoidance system 100 including, but not limited to, an active steering system 200 and active braking system 300, as well as a detection system 400 for the presence of obstacles or slower moving vehicles. Such a detection system 400 may include, but not be limited to, video, radar, laser, sonic systems, and the like, as well as combinations including at least one of the foregoing.

In the figure, an exemplary embodiment is depicted employing optionally, a brake-by-wire system as the active braking system 300. In a brake-by-wire system, there is no mechanical or hydraulic connection between the operator input, e.g., brake pedal with a switch and/or force sensor denoted 310 to sense actuation, and the wheel actuators, 320.

The wheel actuators 320 could be calipers and discs or electromagnetic machines configured to retard the rotation of the wheels 330, for example, electromechanical electromagnetic, or electro-hydraulic actuators, for example, a reciprocating caliper through a rotary-to-linear motion converter with variable actuating force. In another example, wheel actuators 320 may be implemented as solenoid valves for selectively coupling wheel brakes to a source of pressurized hydraulic fluid to increase brake pressure (and brake force) or for selectively coupling brakes to a brake fluid reservoir to decrease brake pressure (and force). It will be appreciated that other brake systems could be used provided they include a capability to apply braking independent of the operator. In addition, the active braking system 300 should preferably include an anti-lock braking system (ABS) functionality. The ABS functionality prevents the wheels 330 from locking during emergency maneuvers, thereby maintaining steerability of host vehicle 22. Vehicles with ABS are equipped with wheel speed sensors 340, which may be used (among other functions) to determine vehicle speed or relative speed among the wheels 330. The active brake system 300 may further include a stability enhancement function. Such stability enhancement functions utilize steering angle, lateral acceleration and yaw rate sensors, which are also used in this invention. Additionally, an estimate of surface coefficient of adhesion is provided by the braking system.

Continuing now with FIG. 1, in an exemplary embodiment of the collision avoidance system 100, an active steering system 200 is employed. The steering system depicted in the figure is an active steer system, in which the steering angle of a steerable wheel 330a is normally controlled by a driver via an input at a steering input device 220, but additional steering correction can be added if necessary. In an exemplary embodiment, the steering system 200 includes an actuator 210 that facilitates combination of a control system input with an operator's input to a steering input device 220 hereinafter known as a steering wheel 220. The actuator 210 can include, for example, an electric DC motor and a gear transmission, which can impose additional rotation on the steering shaft 260. The corrective steer angle can also be added by actuating the steering rack 230. In an exemplary embodiment, the steering input of an operator is detected by a steering angle sensor 240. In addition, the steering angle of the steerable wheel 330a is detected and measured by a steering angle sensor 250. It will be appreciated that numerous well known steering systems could be utilized to facilitate implementation of an exemplary embodiment, including, but not limited to active front steering systems, rear steering systems, steer-by-wire systems and the like, as well as combinations including at least one of the foregoing. A true steer-by-wire system (in which there is no mechanical link between the steering wheel and front wheels) can also be used. The only fundamental capability needed is that the system be capable of controlling the angular position of steerable wheels to the desired values with sufficient speed.

The collision avoidance system 100 of an exemplary embodiment employs a controller 110 interfaced with the various sensors of the host vehicle 22. In order to perform the prescribed functions and desired processing, as well as the computations therefore (e.g., the collision avoidance computations, control algorithm(s), and the like), controller 110 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 110 may include input signal processing and filtering to enable accurate sampling and conversion or acquisitions of such signals from communications interfaces. The controller 110 receives inputs from the various sensors, processes the information, activates systems when necessary, and determines the desired commands to the actuators. Although depicted in the figure as one device, controller 110 may consist of several microprocessors. For example, separate controllers can be used for controlling of the steering and brake systems. Once again, it will be appreciated that while the embodiment disclosed herein is explained by way of discussion concerning a single controller 110 for collision avoidance, use of distributed controllers or equivalent devices may be equally applicable.

The collision avoidance system 100 of an exemplary embodiment employs a controller 110 interfaced with various sensors of the host vehicle 22. The controller 110 receives inputs from the various sensors, processes the information, activates systems when necessary, and determines the desired commands to the actuators. The controller 110 receives signals from standard brake system sensors, brake pedal sensor, wheel speed sensors, computes estimates of vehicle speed, relative distance between the leading vehicle (obstacle) and the following vehicle, estimate of relative speed between the two vehicles, estimate of surface coefficient of adhesion. The controller 110 also receives signals from the steering angle sensors (both steering wheel and road wheel), and dynamic sensors indicative of vehicle dynamics such as yaw rate sensor, a lateral acceleration sensor, and optionally a longitudinal acceleration sensor. Finally the controller 110 receives signals from the detections system 400, including, but not limited to a forward-looking sensor 410, (optionally) side detection sensors 420. The controller 110 processes these signals and determines the inputs for braking system and steering system actuators, 320, 210.

Figure 2:
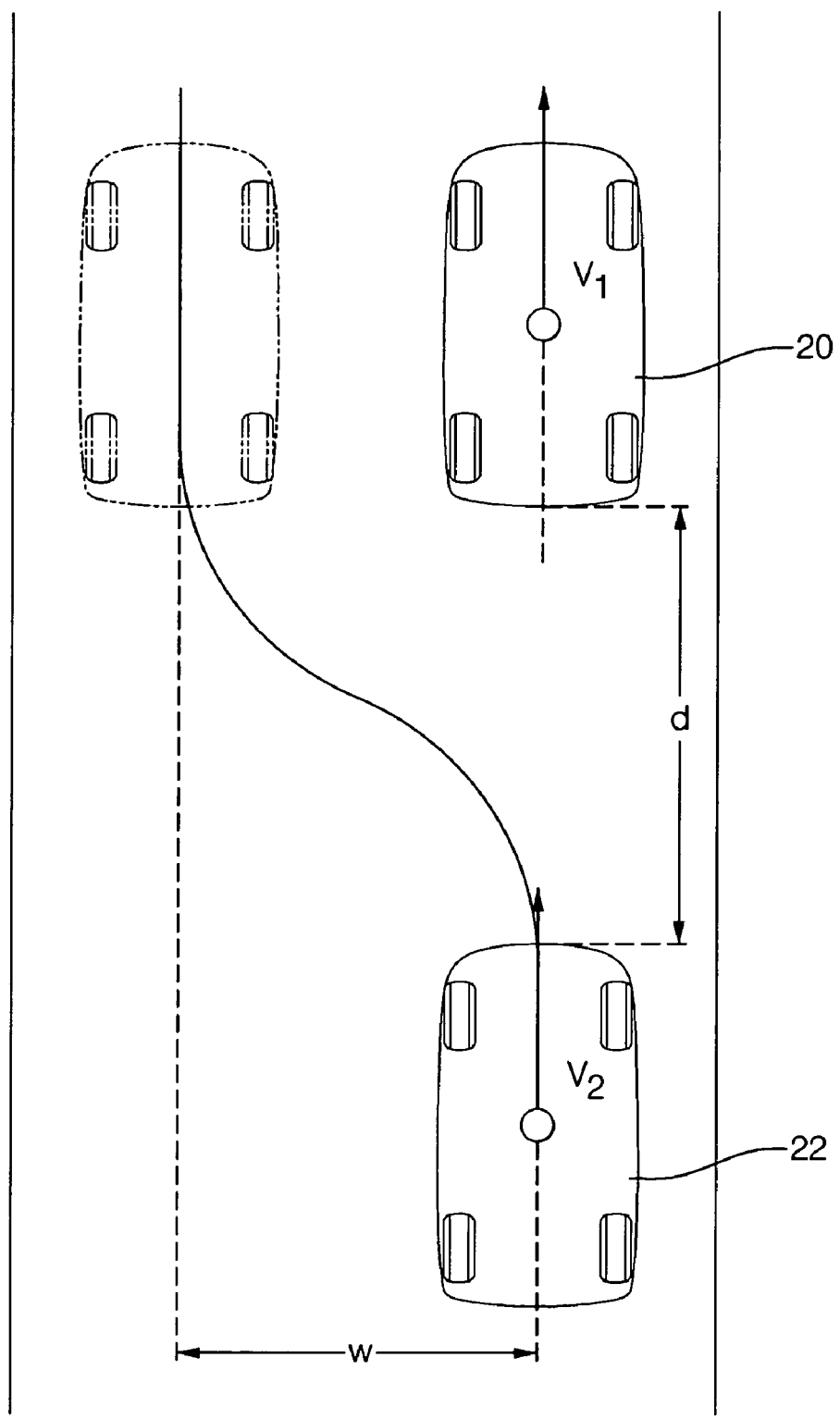
FIG. 2 is diagram depicting an illustrative lane change maneuver.

Referring now to FIG. 2, the operational situation applicable to the invention is illustrated. There are depicted, two vehicles traveling on one vehicle lane: the leading vehicle 20, also denoted Vehicle 1, which can be a non-moving obstacle, and the following host vehicle 22, also denoted Vehicle 2. The (longitudinal) speed of the lead vehicle 20 is $v_1$ and that of host vehicle 110 is $v_2$, with $v_2 > v_1 \geq 0$. The distance between the two vehicles 20 and 22, is defined in FIG. 2, as d. The host vehicle 22 is equipped with sensors, which facilitate the determination of the distance d and the relative speed, $\Delta v = v_2 - v_1$ between the lead and host vehicles 20 and 22. Vehicle speed, $v_2$, is also known, for example, it can be estimated primarily from wheel speed sensors within the steering or brake control systems 200 and 300 respectively. As a result, velocities of both vehicles 20 and 22, denoted $V_1$ and $v_2$ respectively, are known. In addition, vehicle sensors may determine the lateral distance of lead vehicle 20 relative to the host vehicle 22. This information can be used to determine the requisite width of the lane change avoidance maneuver, w, which would be necessary to avoid the collision with the lead vehicle 20. Optionally, if this information is not available, a standard lane change width may be utilized. In addition, information about presence of vehicles or obstacles on adjacent lane(s) may be available to determine whether a lane change can be performed without colliding with other vehicles. In order to decide the course of action, it is critically important to determine first the distances necessary to avoid a collision by emergency braking only and by a combination of steering and braking.

Figure 3:
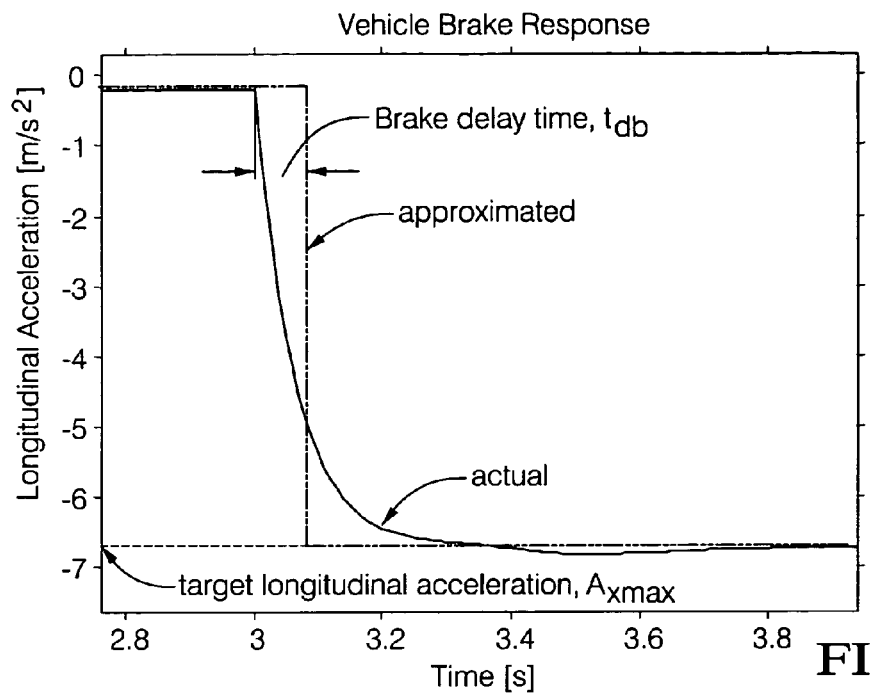
FIG. 3 depicts an illustrative vehicle braking response characteristics.

Determination of Minimum Distance for Collision Avoidance Using Braking Only In order to determine the minimum distance between the host vehicle 22 and lead vehicle 20, which would avoid a collision by braking alone, a simplified model of an emergency braking process is adopted. Referring now to FIG. 3, a response of a vehicle to an applied step in braking is illustrated. As may be appreciated from the figure, it may be seen that after a short transient, a vehicle attains a substantially constant deceleration level, which in the case of emergency braking corresponds to the maximum deceleration that vehicle can develop on a given surface, $A_{xmax}$, (approximately 10 meters/second$^2$ (m/s$^2$) on dry surface). The maximum deceleration can be calculated as $A_{xmax} = g * \mu_{est}$, where g is the gravity acceleration and $\mu_{est}$ is the estimated surface coefficient of adhesion. It will be appreciated that such an estimate may readily be obtained for a brake system in a manner known to those skilled in art. For computational purposes, vehicle longitudinal acceleration response may be estimated as a step response delayed by a selected time delay $t_{db}$ relative to the initiation of braking by an operator (or a brake command is issued, in the instance of an automated system).

Assuming a worst-case scenario, in which the lead vehicle 20 (vehicle 1) is braking with a deceleration $A_{xmax}$, the distance traveled by the lead vehicle 20 while braking is given by:

$$S_1 = (v_{1i}^2 - v_{1f}^2)/(2 * A_{xmax}) \quad (1).$$

where $v_{1i}$ is the initial speed of the lead vehicle 20 (vehicle 1), and $v_{1f}$ is the final speed. (In a special case when $v_{1i} = 0$ $S_1 = 0$). The distance traveled by the host vehicle 22 (vehicle 2) from the moment of brake application is:

$$S_2 = v_{2i} * t_{db} + (v_{2i}^2 - v_{2f}^2)/(2 * A_{xmax}) \quad (2).$$

where $v_{2i}$ and $v_{2f}$ are the initial and final speeds of the host vehicle 22, vehicle 2. The additional term, $v_{2i} * t_{db}$ is included to address the abovementioned time delay in brake activation when vehicle travels with a constant speed. In order to avoid a collision (by braking only), the distance d between vehicles should be greater than the difference in distances traveled by the host vehicle 22, vehicle 2 and the lead vehicle 20, vehicle 1 when the final velocities are equal ($v_{1f} = v_{2f}$):

$$d > S_2(v_{2f} = v_{1f}) - S_1 \quad (3).$$

Substituting equations (1) and (2) into (3), the minimum distance necessary to avoid a collision by braking only is determined as follows:

$$d_{min\_b} = V_{2i} * t_{db} + (v_{2i}^2 - v_{1i}^2)/(2 * A_{xmax}) \quad (4).$$

Note that this distance is a quadratic function of initial speeds of the lead vehicle 20, vehicle 1, and the host vehicle 22, vehicle 2. It will be appreciated that as a function, it increases rapidly with the speed of the host vehicle 22, vehicle 2, especially when the lead vehicle 20, vehicle 1, is moving much slower (or is at rest). The distance $d_{min\_b}$ also increases on slippery surface, roughly in proportion to the inverse of surface coefficient, denoted, $\mu_{est}$, since $A_{xmax}$ is proportional to $\mu_{est}$. When the actual distance, d, is greater than $d_{min\_b}$ a collision can be avoided by braking alone.

Determination of Minimum Distance for Steering and Braking and Steering

Figure 4A:
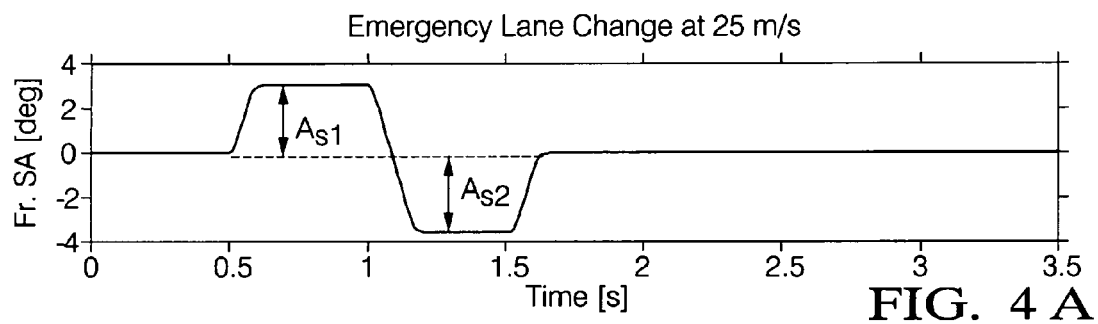
FIG. 4A depicts an illustrative vehicle steering angle response for an exemplary lane change maneuver.
Figure 4B:
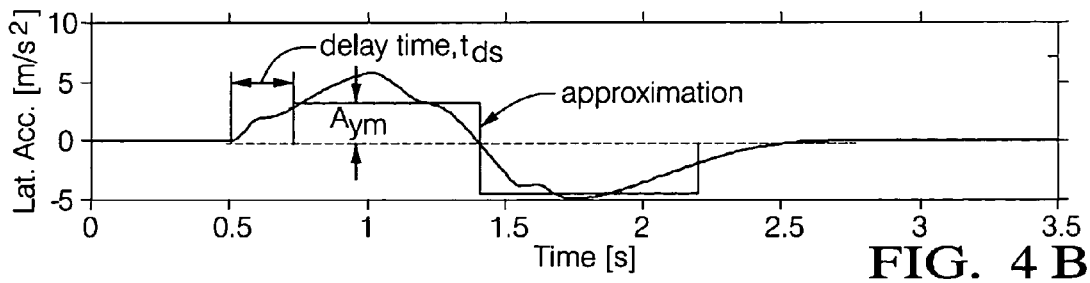
FIG. 4B depicts an illustrative vehicle lateral acceleration response for an exemplary lane change maneuver.
Figure 4C:
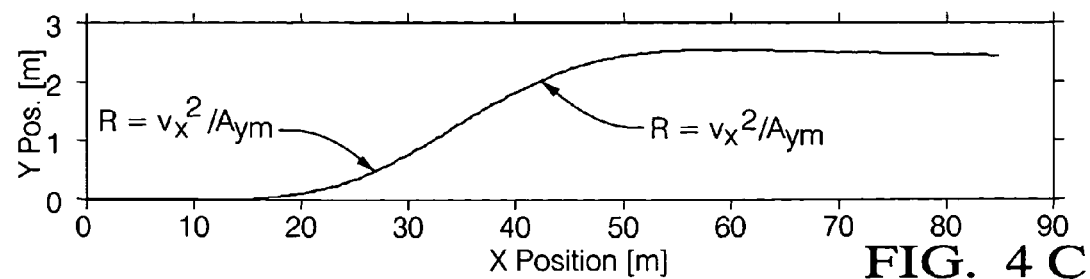
FIG. 4C depicts an illustrative vehicle lateral displacement response for an exemplary lane change maneuver.
Figure 6A:
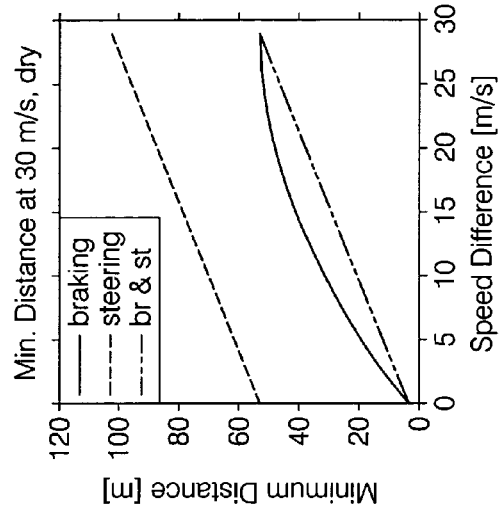
FIGS. 6A–6D depict illustrative comparisons of minimum distances versus speed differences corresponding to FIGS. 5A–5D respectively, including a driver delay.
Figure 6B:
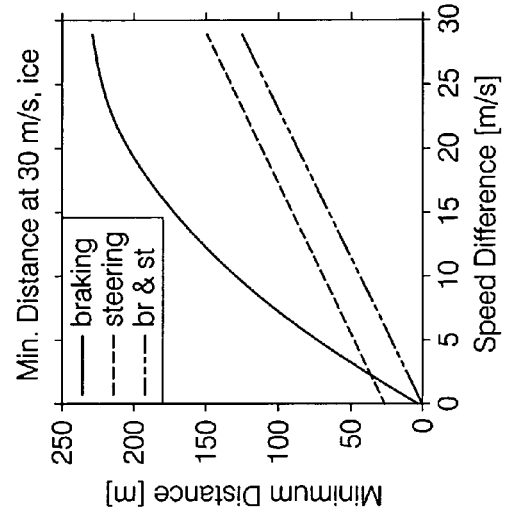
Figure 6C:
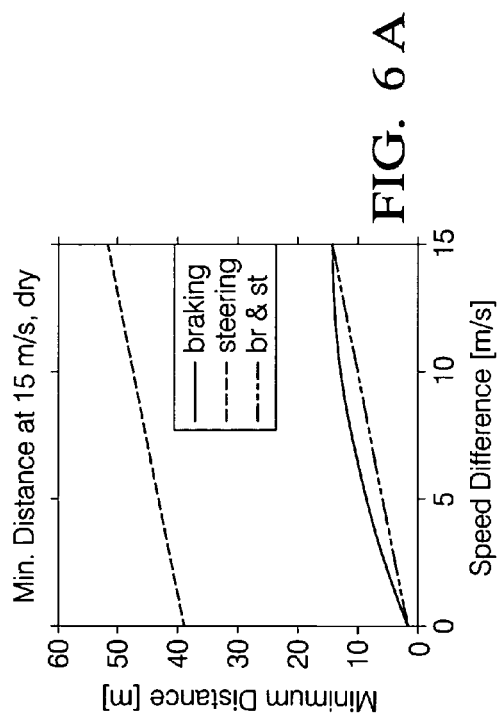
Figure 6D:
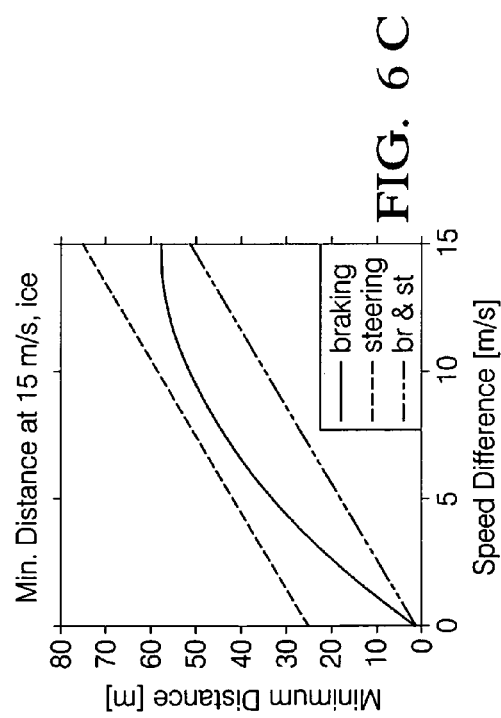

Consider once again the situation depicted in FIG. 2, but assume this time that instead of braking, vehicle 2 steers around the slower moving vehicle by performing a lane change. Examples of steering pattern, lateral acceleration, and the position of the center of gravity during a lane change maneuver are illustrated in FIG. 4A–C. It will be appreciated that in this example, the commanded steering angle while ideally rectangular in shape or pattern, will actually exhibit a steering angle of approximately trapezoidal shape because of the limitation in actuator response. An idealized lateral acceleration profile is utilized here as a model, and is shown in FIG. 4B. The profile exhibits a substantially rectangular shape, and is applied after a delay time $t_{ds}$. The amplitude of lateral acceleration is denoted as $A_{ym}$, which represents an average lateral acceleration magnitude during the lane change. Experience indicates that in an emergency lane change this average lateral acceleration is approximately $0.6 * \mu_{est} * A_{ymax}$, where $A_{ymax}$ is the maximum lateral acceleration that vehicle can generate on dry surface (with a typical value of 8 m/s$^2$ for a sedan). The shape of vehicle path can be approximated by two arcs of radius $R = v_x^2/A_{ym}$, where $v_x$ is vehicle forward velocity.

The distance traveled in the lateral (Y) direction during the first half of the lane change can be approximated by the following equation:

$$Y = A_{ym} * t^2/2 \quad (5).$$

where t is time in seconds. If w is the total lateral travel necessary to perform the lane change, then the time necessary to perform half of it is:

$$t_{1/2} = sqrt(w/A_{ym}) \quad (6).$$

Bearing in mind that the second half of lane change takes the same amount of time as the first half, and including the time delay $t_{ds}$ in developing lateral acceleration, the total time necessary to perform the lane change is:

$$t_{tot} = t_{ds} + 2 * sqrt(w/A_{ym}) \quad (7).$$

Assuming now that during the lane change maneuver the host vehicle 22, vehicle 2, is not braking (but is traveling at a constant speed), the distance traveled by this vehicle is:

$$S_{2s} = v_{2i} * t_{tot} \quad (8).$$

Here, as before, the symbol $v_{2i}$ refers to initial speed of the host vehicle 22, vehicle 2. Moreover, if the vehicle emergency braking is activated with a time delay $t_{db}$, then the distance traveled is:

$$S_{2sb} = \begin{cases} v_{2i} * t_{tot} - A_{xmax} * (t_{tot} - t_{db})^2/2 & \text{when } v_{2i} > (t_{tot} - t_{db}) * A_{xmax} \\ v_{2i} * t_{db} + v_{2i}^2/(2 * A_{xmax}) & \text{when } v_{2i} \leq (t_{tot} - t_{db}) * A_{xmax} \end{cases} \quad (9)$$

Equation (9) considers two cases that depend on the initial velocity of the following vehicle (in this example, the host vehicle 22). If this velocity is small, the vehicle will stop before the lane change is completed (e.g., before time $t_{tot}$ elapses); thus a different equation applies than in the case when it continues to move with constant deceleration.

Assuming the worst case, that the lead vehicle 20 (vehicle 1) is braking with the maximum deceleration $A_{xmax}$, the distance traveled by the lead vehicle 20 is $$S_1 = \begin{cases} v_{1i} * t_{tot} - A_{xmax} * t_{tot}^2/2 & \text{when } v_{1i} > A_{xmax} * t_{tot} \\ v_{1i}^2/(2*A_{xmax}) & \text{when } v_{1i} \leq A_{xmax} * t_{tot} \end{cases} \quad (10)$$

Similar to equation (9), the above formula of equation (10) considers two cases, which depend on the initial velocity of the lead vehicle 20 (vehicle 1), denoted as $v_{1i}$. If this initial velocity is small, the vehicle will stop before the lane change is completed.

By subtracting the distance $S_1$ of Equation (10) from the distance $S_2$, a minimal distance is calculated, which is necessary to perform the lane change by steering only as well as by simultaneous steering and braking. In the first case, the minimum distance is:

$$d_{\min\_s} = \begin{cases} (v_{2i} - v_{1i}) * t_{tot} + A_{xmax} * t_{tot}^2/2 & \text{when } v_{1i} > A_{xmax} * t_{tot} \\ v_{2i} * t_{tot} - v_{1i}^2/(2*A_{xmax}) & \text{when } v_{1i} \leq A_{xmax} * t_{tot} \end{cases} \quad (11)$$

$$d_{\min\_sb} = \quad (12)$$

$$\begin{cases} (v_{2i} - v_{1i}) * t_{tot} + A_{xmax} * & \text{when: } v_{1i} > A_{xmax} * t_{tot} \text{ and} \\ [t_{tot}^2 - (t_{tot} - t_{db})^2]/2 & v_{2i} > (t_{tot} - t_{db}) * A_{xmax} \\ v_{2i} * t_{tot} - v_{1i}^2/(2*A_{xmax}) - & \text{when: } v_{1i} \leq A_{xmax} * t_{tot} \text{ and} \\ A_{xmax} * (t_{tot} - t_{db})^2/2 & v_{2i} > (t_{tot} - t_{db}) * A_{xmax} \\ v_{2i} * t_{db} + & \text{when: } v_{1i} \leq A_{xmax} * t_{tot} \text{ and} \\ (v_{2i}^2 - v_{1i}^2)/(2*A_{xmax}) & v_{2i} \leq (t_{tot} - t_{db}) * A_{xmax} \end{cases}$$

It will be appreciated that the condition where $v_{1i} > A_{xmax} * t_{tot}$ and $v_{2i} \leq (t_{tot} - t_{db}) * A_{xmax}$ is not possible, since premise of the derivation is based on $v_{1i} < v_{2i}$. It should be noted further, that with the exception of the last case (when both vehicles stop prior to completion of lane change), the minimum distances depend linearly on the initial speed of the following vehicle i.e., the host vehicle 22, $v_{2i}$, in contrast to the case of braking only. Thus, it can be expected that at high speeds steering is more effective, requiring less distance than braking.

Moreover, the impact of surface coefficient $\mu_{est}$ on the minimum distance necessary for emergency lane change is less dramatic than in the case of braking. Therefore, when the time, $t_{tot}$ from equation (7) is substituted into equation (11), the resultant is:

$$d_{\min\_s} = \quad (13)$$

$$\begin{cases} (v_{2i} - v_{1i})[t_{ds} + 2(w/A_{ym})^{1/2}] + \\ A_{xmax}[t_{ds} + 2(w/A_{ym})^{1/2}]^2/2 & \text{when: } v_{1i} > A_{xmax} t_{tot} \\ v_{2i}[t_{ds} + 2(w/A_{ym})^{1/2}] - v_{1i}^2/(2A_{xmax}) & \text{when: } v_{1i} \leq A_{xmax} t_{tot} \end{cases}$$

Since $A_{ym}$ and $A_{xmax}$ are proportional to surface coefficient of adhesion, $\mu_{est}$, the distance $d_{\min\_s}$ is roughly inversely proportional to the square root of surface coefficient $\mu_{est}$, whereas for braking only the minimum distance is approximately inversely proportional to the surface coefficient.

It should further be appreciated that in the above equations, the same notation was used for maximum deceleration, $A_{xmax}$, and the mean lateral acceleration, $A_{ym}$. However, in the case of combined steering and braking, both values should be slightly reduced, relative to braking only or steering only cases, in order to reflect the reduction in tire lateral force capability under braking and vice versa in maneuvers performed close to the limit of adhesion with the road surface.

The resultant minimum distances necessary to avoid collision for the three cases: braking only, steering only, and steering and braking combined, are given in FIGS. 5A through 5D. In FIGS. 5A and 5B the results obtained on dry surface are shown for the speed of the following host vehicle 22 of 15 m/s (FIG. 5A) and 30 m/s (FIG. 5B). The numerical data used was: $t_{db}$=0.1 seconds (s), $t_{dsb}$=0.3 s, $A_{xmax}$=9 m/s$^2$, $A_{ym}$=5 m/s$^2$. In FIGS. 5C and 5D the same results on icy road with surface coefficient of 0.2 are shown. In this case $A_{xmax}$=2 m/s$^2$ and $A_{ym}$=1.1 m/s$^2$ were assumed. On dry surface at low speeds, steering only is less effective than braking, regardless of the relative velocity between the vehicles. Steering becomes more effective than braking when the absolute speed of host vehicle 22 or the difference in speed between the lead vehicle 20 and host vehicle are large, or when the road surface becomes slippery. On icy road e.g., with low surface adhesion, steering is almost always more effective than braking. Finally, it is most evident that braking and steering is always more effective (in the sense that it requires less distance) than braking alone. It can therefore be concluded that there is a potential for avoiding some accidents when active steering is applied in addition to braking. These findings are not necessarily surprising to experienced drivers, but the quantitative analysis outlined above provides a means for the design decisions employed with an exemplary embodiment depending on operational circumstances.

It should be noted that the minimum distances illustrated in FIG. 5 are generally substantially smaller than those required by Adaptive Cruise Control systems mentioned earlier, since ACC systems include the driver's reaction time as well as the brake delay. In addition, current ACC systems do not fully apply brakes, but rely on driver reaction. It is also beneficial to note that even at the speed of 30 m/s on ice (close to the legal speed limit in the USA), the minimum distance necessary to perform the lane change with braking does not exceed 100 m. Maintaining this distance within 100 meters is considered advantageous in that 100 m is currently considered a reasonable limit on the distance for accurate determination of lateral lane position of vehicles ahead by current detection systems.

When the actual (measured) distance between the lead vehicle and the host vehicle 22 is larger than $d_{\min\_b}$, but smaller then $d_{\min\_bs}$, then a collision cannot be avoided by braking only, but advantageously, can be avoided by braking and steering. In this instance, if the driver does not steer and it is determined that the adjacent lane is free of traffic, then the steering system is activated to perform an emergency lane change maneuver.

Supported by the above calculations, in an exemplary embodiment a fully automatic collision avoidance system 100 is disclosed. In such a system 100, the only significant delay in the system was introduced by steering and braking actuators of the active steering system 200 and braking system 300. Additionally, such a collision avoidance system 100 utilizes an optional detection system 400, for example, a side-looking radar system to detect presence of an obstacle in the adjacent lane. In an alternative embodiment, a simplified version of the abovementioned system 100 is considered. In this embodiment, the detection system 400 is not employed. In this instance, a driver provides a cue to the collision avoidance system 100 that the roadway is clear for a lane change. In an exemplary embodiment, the lane change is initiated when driver quickly moves the steering wheel in the selected direction. Based on the operator input, permission for a lane change is granted, when, in addition to previously mentioned conditions, the combination of a hand wheel angle and its derivative exceeds a selected threshold value. In addition, the determination for a manually initiated lane change may be speed dependent and the direction of the operator command determines the direction for the steering response. In other words, a manually initiated lane change is made to a lane in the same direction as the initial operator input. When it is determined that a lane change should be conducted, the minimum distances necessary for braking and the lane change are computed utilizing the abovementioned equations and methodology.

Once again, it is beneficial to investigate under what conditions simultaneous braking and steering around the obstacle provides advantages over braking alone. In this instance, a lane change is initiated by a driver and includes a significant delay. To illustrate, consider a simulation of the situation where braking is applied automatically with a time delay of $t_{db}=0.1$ s, corresponding to the delay of a braking actuator, but the lane change is initiated after 2 s, representing a combined delay of a driver and vehicle steering response.

FIGS. 6A–D depicts an illustrative response of resulting minimum distances necessary to avoid a collision with an estimated delay included correlating with FIGS. 5A–D. Once again it is noteworthy to recognize that the minimum distance for the case of braking with steering is always less than or equal to that obtained for braking alone. However, it is evident that the difference between the two is much smaller than the comparisons depicted in FIGS. 5A–D. On ice the distance necessary to avoid a collision with a stopped object extends to about 130 m when the vehicle speed is 30 m/s. In order to keep this distance below 100 m on ice, the vehicle speed cannot exceed 25 m/s.

Steering Control in Emergency Lane Change Maneuver

In order to perform a smooth but quick lane change maneuver, the active steering system 200 provides a commanded steering angle based on a feedforward component and a feedback component. The feedforward component is employed to provide primary control for the lane change maneuver and to generate the desired values of vehicle yaw rate, heading angle, lateral velocity and lateral position. The role of feedback component is to make the control robust with respect to stability, disturbances and changes in environment. For example, if during performing the emergency lane change the road surface becomes more slippery than at the beginning of maneuver, making it impossible for the vehicle to achieve desired lateral acceleration, feedback control will correct the steering input in such a manner that the desired lateral deviation is approximately achieved.

The feedforward portion of the steering input is computed as follows. After the total time necessary to perform the lane change, $t_{tot}$, is computed from equation (7), the steering angle at the front wheels is determined as follows:

$$\delta_{ffu} = \begin{cases} 2*A_{ym}*(K_u + L/v_x^2) & \text{when } t \le t_{tot}/2 \\ -2*A_{ym1}(K_u + L/v_x^2) & \text{when } t_{tot}/2 < t \le t_{tot} \end{cases} \quad (14)$$

When $t>t_{tot}$, $\delta_{ffu}=0$. Here $v_x$ is vehicle speed (at the time when the given steering input is applied), $K_u$ is the understeer coefficient of vehicle and L is vehicle wheelbase. $A_{ym}$, is the average lateral acceleration during the lane change and $A_{ym1}$ is slightly higher than $A_{y1}$. The first steering motion is in the direction of the free lane as determined by sensors, and the second motion is in the opposite direction to straighten the vehicle path. The time duration of each steering motion is $t_{tot}/2$. The second steering motion is performed with higher amplitude than the first, since it is required to maintain a symmetric character of maneuver, especially when vehicle is slowing down. The rate of change of the steering angle (given by equation 14) is then limited to that achievable by steering actuator; subsequently, the steering angle is passed through a low-pass filter. As a result, the feedforward steering angle, denoted $\delta_{ff}$, is obtained that has the same pattern as that shown in FIG. 4A.

Using the feedforward part of the steering angle, the desired values of vehicle yaw rate, also denoted as $\Omega_d$, heading angle, also denoted as $\psi_d$, lateral velocity (with respect to the road), also denoted $V_{yd}$, and lateral position, also denoted Y are determined as follows:

$$\Omega_d = v_x * \delta_{ff}(L + K_u * v_x^2); \quad \psi_d = \int_{t_0}^{t} \Omega_d(\tau) d\tau; \quad (15)$$

$$V_{yd} = v_x * \tan(\psi_d); \quad Y_d = \int_{t_0}^{t} V_{yd}(\tau) d\tau; \quad (16)$$

The estimates of actual vehicle heading, $\psi$, lateral velocity, $V_y$, and position on the roadway, Y, may readily be obtained from measured yaw rate, $\Omega$, and (estimated) vehicle speed, $v_x$, as follows:

$$\psi = \int_{t_0}^{t} \Omega(\tau) d\tau; \quad (17)$$

$$V_y = v_x * \tan(\psi); \quad Y = \int_{t_0}^{t} V_y(\tau) d\tau; \quad (18)$$

Alternatively, lateral position measurement obtained from the optional detection system 400 (e.g., a radar) could be used, in place of the position obtained by integration of calculated lateral velocity, $V_{y\_est}$. It will be appreciated that a measured parameter is commonly preferred to avoid mathematical/numerical solution anomalies associated with integrating bias in yaw rate measurement. Finally, given the desired and estimated values of yaw rate, lateral velocity and lateral position, the feedback steering angle correction is determined as follows:

$$\Delta\delta_{fb}=g_1(v_x)*(Y_d-Y)+g_2(v_x)*(V_{yd}-V_y)+g_3(v_x)*(\Omega_d-\Omega) \quad (19)$$

where $g_1$, $g_2$ and $g_3$ are speed-dependant scheduling gains, configured as decreasing functions of time. This is necessary, since the unit changes in the front steering angle required to generate unit changes in the lateral position, lateral velocity and yaw rate decrease as vehicle speed increases. The feedback gains are selected to assure that in normal (dry road) conditions the lane change is performed quickly and without overshoot. At the same time, vehicle response remains stable for roadway surface coefficients as low as 0.1.

The total front steering angle, $\delta_f$, during the emergency lane change maneuver is a sum of feedback and feedforward parts:

$$\delta_f = \delta_{ff} + \Delta\delta_{fb} \qquad (20)$$

The lane change is deemed complete and the control is disabled when the desired feedforward steering angle, $\Delta_{ff}$ is zero (alternatively, when $t>t_{tot}$) and both the magnitude of the lateral position error and the absolute value of heading angle are below respective thresholds. That is:

$$\delta_{ff} = 0 \text{ (alternatively, when } t>t_{tot}) \qquad (21a)$$

$$|Y_d - Y| < \text{Thre}_Y \qquad (21b)$$

$$|\psi| < \text{Thre}_\psi \qquad (21c)$$

Upon completion of the emergency lane change maneuver, control of vehicle steering is returned to the driver. Directional control of vehicle is also gradually returned to the driver when a combination of driver steering angle and the derivative of the steering angle is sufficiently large. This indicates that driver is alert and attempts to provide steering correction himself. In this case, the steering angle commanded by the emergency lane change algorithm implemented in an exemplary embodiment of the collision avoidance system 100 is gradually reduced from the current value to zero, over a selected duration. In an exemplary embodiment, a period of about one second is utilized.

The above analysis applies to the lane change during driving on straight segments of roads. However, it can easily be extended to vehicle operation on road surfaces that are not necessarily straight. For example, for a roadway with a constant radius curve, the steering angle (and vehicle yaw rate) may be decomposed into two parts: a steady-state part, $\delta_{ss}$, necessary to maintain vehicle on the curve, and a steering angle necessary to perform a lane change on curved road. Assume that just prior to the emergency lane change maneuver the vehicle speed is $v_{x0}$ and vehicle yaw rate, measured by sensor, is $\Omega_{ss0}$. The radius of curvature of roadway, R, is therefore:

$$R = v_{x0}/\Omega_{ss0} \qquad (22)$$

Since the road curvature is assumed constant, the "steady—state" portion of yaw rate necessary to maintain this curvature is $$\Omega_{ss} = \Omega_{ss0} * v_x / v_{x0} \qquad (23)$$

$$\delta_{ss} = \Omega_{ss} * (L/v_x + K_u * v_x) \qquad (24)$$

The steady-state values of yaw rate and steering angle decrease as vehicle speed decreases due to braking (although the steering angle decreases rather slowly). Thus, the desired steering angle is $$\delta_{fd} = \delta_{ss} + \delta_{ff} \qquad (25)$$

where the $\delta_{ff}$ is the feedforward part of the steering angle necessary to perform the lane change, as computed before (that is calculated from equation (14) and then filtered). The desired yaw rate is:

$$\Omega_d' = \Omega_{ss} + \Omega_d \qquad (26)$$

where $\Omega_d$ denotes the part of the desired yaw rate necessary to perform the lane change; it is computed according to equation (15). In the case of vehicle operating on a curve, it is more convenient to define the desired heading angle, the desired lateral velocity and the desired lateral position of vehicle with respect to the axis system normal and tangential to the curved road. In this case, the desired values of the heading angle, lateral velocity and lateral position (relative to the center of original lane) respectively, are defined by equations (15) and (16) as before.

The estimate of the actual heading angle (again measured with relation to the tangent to the centerline of original lane of travel), is now:

$$\psi = \int_{t_0}^{t} [\Omega(\tau) - \Omega_{ss}(\tau)]d\tau \qquad (27)$$

since the yaw rate $\Omega_{ss}$ necessary to follow the road curvature has to be factored out. The lateral velocity and the lateral position relative to the road centerline are given be equation (18). The feedback control law is the same as before (equation 19), except that the desired yaw rate $\Omega_d'$ is substituted for $\Omega_d$. That is $$\Delta\delta_{fb} = g_1(v_x)*(Y_d - Y) + g_2(v_x)*(V_{yd} - V_y) + g_3(v_x)*(\Omega_d' - \Omega) \qquad (28)$$

The total steering angle is the sum of $\delta_{fd}$ (equation 25) and the feedback correction, $\Delta\delta_{fb}$.

Algorithm Description

Figure 7:
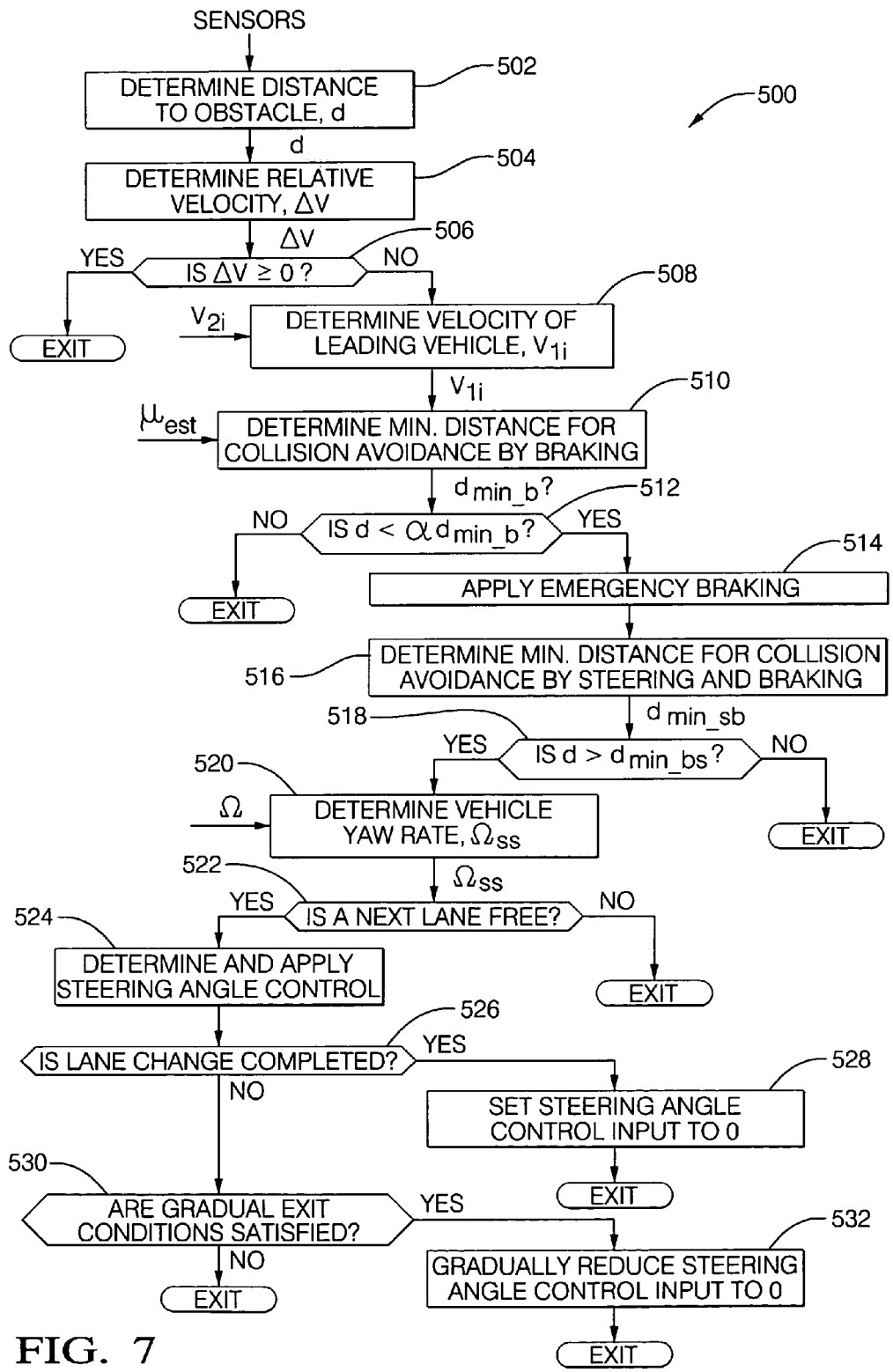
FIG. 7 is a flowchart of a collision avoidance methodology in accordance with an exemplary embodiment.

Referring now to FIG. 7 as well, a flow chart is provided depicting an algorithm for implementation of an exemplary embodiment of the method 500 disclosed herein. The algorithm depicted provides a methodology to determine the control actions/interactions of the active steering system 200 and braking system 300 of the collision avoidance system 100 in an emergency maneuver situation. Referring now to FIG. 7A at block 502 in an exemplary embodiment, a process determines the presence of obstacle e.g., lead vehicle 20 and detects the distance d to the obstacle from a host vehicle 22. At process block 504 the relative velocity, $\Delta v$, between the obstacle e.g. lead vehicle 20 and the host vehicle 22 is determined. The relative velocity may be computed as the time derivative of the distance, d. Numerous numerical methodologies for computing a time derivative are known in the art.

Referring now to decision block 506 a determination is made as to whether the relative velocity is greater than or equal to zero, $\Delta v \geq 0$. If so, then the process exits, otherwise the process proceeds to block 508. A relative velocity, $\Delta v \geq 0$ indicates that the leading vehicle 20 (vehicle 1) moves with at least the same speed as the host vehicle 22 (vehicle 2) and there is no immediate danger of collision.

At block 508, a velocity of leading vehicle 20, $v_{1i}$ is determined. This velocity may be computed as the sum of the estimated speed of host vehicle 22, $v_{2i}$, (obtained for example, from a wheel speed) and the relative speed $\Delta v$ as determined previously. In other words:

$$v_{1i} = v_{2i} + \Delta v.$$

The minimum distance necessary to avoid collision by braking, $d_{min\_b}$. alone is determined at block 510. This distance may be calculated as described above; utilizing equation (4), the speeds of both the lead vehicle 20, $v_{1i}$ and the host vehicle 22, $v_{2i}$, the delay time in brake system, $t_{db}$, and the maximum longitudinal deceleration, $A_{xmax}$. Once again, the value of $A_{xmax}$ depends on the estimated surface coefficient of adhesion, $\mu_{est}$, according to formula: $A_{xmax} = \mu_{est} * g$, where g is gravity acceleration. An estimate of surface coefficient is obtained from braking system 300 using known techniques and methodologies.

Turning now to decision block 512 for further discussion of an exemplary embodiment, a determination is made as to whether the distance, d between the vehicles is less than the computed minimum distance to avoid a collision with braking alone, $d<\alpha^* d_{min\_b}$. If so, the methodology 500 transfers to block 514 of to apply emergency braking. The condition $d<\alpha^* d_{min\_b}$ indicates that the actual distance, d, is too small and vehicles are in a danger of potential collision if emergency braking is not initiated. The coefficient $\alpha$ is selected to be greater than 1, with a preferred value of about 1.2.

Block 514 of the process describes applying emergency braking. The commanded vehicle deceleration increases as a step function to a maximum value. It should be noted that if the vehicle is on a slippery surface, antilock braking system (ABS) system if available, may be activated. At block 516 the minimum distance necessary to avoid a collision by braking and steering, $d_{min\_sb}$ combined is determined. This distance is calculated according to equation (12). Once again, the maximum vehicle deceleration, $A_{xmax}$, allowable is limited to be slightly (typically about 10%) smaller than the value used for braking alone. It is noteworthy to appreciate that the distance $d_{min\_sb}$ depends not only on velocities of both vehicles 20, 22, but also on the surface coefficient of adhesion, $\mu_{est}$, which is accounted for through the values of $A_{xmax}$ and $A_{ym}$.

Turning now to decision block a determination is made as to whether the actual distance d is larger than $d_{min\_sb}$. If not, the process exits, (e.g. in this instance, continuing to apply emergency braking only), otherwise the process continues for consideration of combined braking and steering,.

At process block 520 in an exemplary embodiment the "steady state" vehicle yaw rate, $\Omega_{ss0}$ is determined to facilitated computation of the steering maneuver if one is possible. The value of $\Omega_{ss0}$ indicates whether the host vehicle is driven straight or is on a curve. $\Omega_{ss0}$ is a low-pass version of the measured yaw rate, $\Omega$, and can be interpreted as a moving average of yaw rate signal. Decision block 522 includes processes to determine whether the adjacent lane is free of obstacles, e.g., traffic. If the lane is open, the method 500 proceeds to process block 524 for steering control, if the lane is not available, the process exits, e.g., continues with emergency braking alone. As stated above the determination as to whether there is an obstacle in the lane is made by detection system 400. The detection system 400 may employ a side-looking camera or radar system. Once again, if such a detection system 400 is not available, the determination is made only when driver gives a cue to the collision avoidance system 100 via a steering input.

Finally, at block 524 the methodology 500 determines and applies the desired steering angle control input, $\delta_f$ to implement the steering correction desired for the emergency lane change maneuver. The calculation of the steering input necessary to perform an emergency lane change includes several steps, some of which depend on whether the vehicle is driven straight or on a curve. When the magnitude of "steady state" value of yaw rate determined at block 520 of the method 500 is below a selected threshold, the vehicle is assumed to be driven straight. In this instance, the steering angle is determined from the equations (15) through (20) as described before. When vehicle is judged to be in a curve, modifications to the calculations as described by equations (22) through (28) are made.

Turning now to FIG. 7C, at decision block 526 of an exemplary embodiment, it is determined whether the emergency lane change is completed. The lane change is completed when the exit conditions (identified in equations 21a–c) are simultaneously satisfied. If the lane change maneuver is determined to be complete, then the steering command for the collision avoidance maneuver is returned to zero at block 528 and the process exits. If the lane change maneuver is not complete, the method 500 continues to decision block 530 to determine whether gradual exit conditions are satisfied.

In an exemplary embodiment, the gradual exit conditions are satisfied when a linear combination of driver requested steering angle and the derivative of the steering angle is greater than a selected threshold (that is, $\delta_{dr}+k^* d\delta_{dr}/dt$>Threshold), where $\delta_{dr}$ is the driver requested steering angle and k a constant). These conditions indicate that the driver is alert and is attempting to provide steering correction. In this instance, the control steering angle input calculated and applied at block 524 is gradually phased out (e.g., it is linearly reduced to zero over a specified period of time) as depicted at block 532. If the exit conditions are not satisfied, the method 500 exits (with the emergency collision avoidance maneuver continuing).

It should be noted that while the above disclosure describes the preferred embodiment of the invention, it will become obvious to those skilled in art that there can be many variations to the proposed collision avoidance algorithms and methodology. In particular, it will be readily appreciated that there exist numerous means of determining whether the adjacent lane is free of obstacles, or determining when an emergency lane change should be performed. Furthermore, it may readily be contemplated that there are numerous configurations for the steering pattern disclosed as an exemplary embodiment.

A preferred embodiment for implementing a derivative evaluates a changing parameter over a fixed interval of time to perform the computation. It will be appreciated by those skilled in the art, that the computation may be performed with several variations. An alternative embodiment, evaluates a changing measured time interval for a fixed parameter change to perform the computation. Further, in yet another embodiment, both the interval of time and interval parameter could be measured and compared with either of the parameters occurring at a fixed interval.

The disclosed invention can be embodied in the form of computer or controller 110 implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller 110, the computer becomes an apparatus for practicing the invention. The present invention may also be embodied in the form of computer program code as a data signal 15, for example, whether stored in a storage medium, loaded into and/or executed by a computer or controller 110, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for collision avoidance using automated braking and steering comprising:
   determining an actual distance to an obstacle in a path of a vehicle;
   determining a relative velocity between said obstacle and said vehicle;
   determining a first distance sufficient to avoid collision by braking only;
   determining a second distance sufficient to avoid collision by combined braking and steering around said obstacle;
   applying braking if at least one of, said first distance exceeds said actual distance and said first distance is within a selected threshold of said actual distance; and
   if said actual distance exceeds said second distance and a lane change is permitted, applying steering control to affect a lane change.

2. The method of claim 1 wherein a lane change is permitted if at least one of: an operator cue is detected; and a detection system determines that an adjacent lane is clear.

3. The method of claim 1 further including determining a velocity of said obstacle.

4. The method of claim 1 further including determining a vehicle yaw rate.

5. The method of claim 1 further including determining a surface coefficient of adhesion.

6. The method of claim 1 further including determining if said lane change is complete.

7. The method of claim 6 wherein said lane change is complete if: a heading angle magnitude is less than a selected threshold, a lateral position error magnitude is less than a selected threshold, and at least one of a desired feedforward steering angle is substantially zero and a time elapsed exceeds a total allowable time for said lane change.

8. The method of claim 7 further including setting said steering control to null.

9. The method of claim 7 further including determining if gradual exit conditions are satisfied.

10. The method of claim 7 further including reducing steering control to null at a selected rate.

11. The method of claim 1 wherein said steering control comprises:
    using a feedforward control component and a feedback control components;
    said feedforward control component employing a selected steering pattern based on vehicle speed and an estimated surface coefficient of adhesion; and
    said feedback control component using a measured yaw rate, at least one of an estimated lateral position and a measured lateral position, and at least one of an estimated lateral velocity and a measured lateral velocity.

12. A system for collision avoidance in a vehicle using automated braking and steering comprising:
    an active braking system comprising:
       a wheel actuator in operable communication with a vehicle wheel,
       a wheel speed sensor, and
       a sensor for detecting an application of braking by an operator,
       said active braking system including antilock braking functionality;
    an active steering system comprising:
       an operator input device,
       an actuator in operable communication with a steerable wheel, said actuator configured to adjust a steering angle of said steerable wheel independent of an input to said operator input device;
       a first steering angle sensor in operable communication with said operator input device for detecting a steering angle indicative of an operator input,
       a second steering angle sensor in operable communication with said steerable wheel for detecting another angle indicative of a position of said steerable wheel;
    a detection system comprising a sensor configured to detect an obstacle in a path of said vehicle; and
    a controller in operable communication with said active braking system, said active steering system, and said detection system said controller executing a method for collision avoidance using automated braking and steering.

13. The system of claim 12 wherein said active braking system includes a brake-by-wire system.

14. The system of claim 12 wherein said active braking system wheel actuator comprises at least one of an electro hydraulic, electromechanical, and electromagnetic actuator.

15. The system of claim 12 wherein said active steering system comprises at least one of an front steering system with differential actuator, a steer-by-wire system, and a rear wheel steer system.

16. The system of claim 12 wherein said detection system further includes a side detection sensor in operable communication with said controller configured to facilitate detection of an obstacle laterally from said vehicle.

17. The system of claim 12 wherein said detection system further includes side detection sensos.

18. The system of claim 12 wherein said controller determines that a lane change is permitted if at least one of: an operator cue is detected; and said detection system determines that an adjacent lane is clear.

19. The system of claim 12 wherein said controller determines a velocity of said obstacle.

20. The system of claim 12 wherein said controller determines a vehicle yaw rate.

21. The system of claim 12 wherein said controller determines a surface coefficient of adhesion.

22. The system of claim 12 wherein said controller determines if said lane change is complete.

23. The system of claim 22 wherein said lane change is complete if: a heading angle magnitude is less than a selected threshold, a lateral position error magnitude is less than a selected threshold, and at least one of a desired feedforward steering angle is substantially zero and a time elapsed exceeds a total allowable time for said lane change.

24. The system of claim 23 wherein said controller sets said steering control to null.

25. The system of claim 23 wherein said controller determines if gradual exit conditions are satisfied.

26. The system of claim 23 wherein said controller reduces steering control to null at a selected rate.

27. The system of claim 12 wherein said steering control comprises:
a feedforward control component and a feedback control components;
said feedforward control component employing a selected steering pattern based on vehicle speed and an estimated surface coefficient of adhesion; and
said feedback control component using a measured yaw rate, at least one of an estimated lateral position and a measured lateral position, and at least one of an estimated lateral velocity and a measured lateral velocity.

28. A system for collision avoidance in a vehicle using automated braking and steering comprising:
a means for determining an actual distance to an obstacle in a path of a vehicle;
a means for determining a relative velocity between said obstacle and said vehicle;
a means for determining a first distance sufficient to avoid collision by braking only;
a means for determining a second distance sufficient to avoid collision by combined braking and steering around said obstacle;
a means for applying braking if at least one of, said first distance exceeds said actual distance and said first distance is within a selected threshold of said actual distance; and
a means for determining if said actual distance exceeds said second distance and a lane change is permitted, and a means for applying steering control to affect a lane change.

29. A storage medium encoded with a machine-readable computer program code, said computer program code including instructions for causing controller to implement a method for collision avoidance using automated braking and steering comprising:
determining an actual distance to an obstacle in a path of a vehicle;
determining a relative velocity between said obstacle and said vehicle;
determining a first distance sufficient to avoid collision by braking only;
determining a second distance sufficient to avoid collision by combined braking and steering around said obstacle;
applying braking if at least one of, said first distance exceeds said actual distance and said first distance is within a selected threshold of said actual distance; and
if said actual distance exceeds said second distance and a lane change is permitted, applying steering control to affect a lane change.

30. A computer data signal, said data signal comprising code configured to cause a controller to implement a method for collision avoidance using automated braking and steering comprising:
determining an actual distance to an obstacle in a path of a vehicle;
determining a relative velocity between said obstacle and said vehicle;
determining a first distance sufficient to avoid collision by braking only;
determining a second distance sufficient to avoid collision by combined braking and steering around said obstacle;
applying braking if at least one of, said first distance exceeds said actual distance and said first distance is within a selected threshold of said actual distance; and
if said actual distance exceeds said second distance and a lane change is permitted, applying steering control to affect a lane change.

31. A method for collision avoidance using automated braking and steering comprising:
determining an obstacle is in a path of a vehicle with which a collision may occur;
applying maximum emergency braking without skidding;
if a lane change is permitted, applying steering control to affect a lane change, wherein said steering control is configured to achieve a maximum lateral acceleration sufficient to cause lateral displacement without loss of surface adhesion; and
determining if said lane change is complete, wherein said lane change is complete if a heading angle magnitude is less than elected threshold, a lateral position error magnitude is less than a selected threshold, and at least one of a desired feedforward steering angle is substantially zero and a time elapsed exceeds a total allowable time for said lane change.

32. The method of claim 31 wherein a lane change is permitted if at least one of: an operator cue is detected; and a detection system determines that an adjacent lane is clear.

33. The method of claim 31 further including determining a velocity of said obstacle.

34. The method of claim 31 further including determining a vehicle yaw rate.

35. The method of claim 31 further including determining a surface coefficient of adhesion.

36. A system for collision avoidance in a vehicle using automated braking and steering comprising:
a means for determining an obstacle is in a path of a vehicle with which a collision may occur;
a means for applying maximum emergency braking without skidding;
a means for determining: if a lane change is permitted; and
a means for applying steering control to affect a lane change, wherein said steering control is configured to achieve a maximum lateral acceleration sufficient to cause lateral displacement without loss of surface adhesion; and
means for determining if said lane change is complete, wherein said lane change is complete if a heading angle magnitude is less than a selected threshold, a lateral position error magnitude is less than a selected threshold, and at least on of a desired feedforward steering angle is substantially zero and a time elapsed exceeds a total allowable time for said lane change.

37. A method of controlling a steering angle input in order to automatically perform an emergency lane change
using a feedforward control component and a feedback control components;
said feedforward control component employing a selected steering pattern based on vehicle speed and an estimated surface coefficient of adhesion; and
said feedback control component using a measured yaw rate, at least one of an estimated lateral position and a measured lateral position, and at least one of an estimated lateral velocity and a measured lateral velocity.

38. A method for collision avoidance using automated braking and steering comprising:
determining an obstacle is in a path of a vehicle with which a collision may occur;

applying maximum emergency braking without skidding;

if a lane change is permitted, applying steering control to affect a lane change, wherein said steering control is configured to achieve a maximum lateral acceleration sufficient to cause lateral displacement without loss of surface adhesion, wherein said applying steering control includes using a feedforward control and a feedback control, said feedforward control employing a maximum lateral acceleration based on vehicle speed and an estimated surface coefficient of adhesion, said feedback control using a measured yaw rate, at least one of an estimated lateral position and a measured lateral position, and at least one of an estimated lateral velocity and a measured lateral velocity.

* * * * *